(12) United States Patent
Johnston, Jr. et al.

(10) Patent No.: US 10,944,803 B1
(45) Date of Patent: Mar. 9, 2021

(54) CONTROLLED-ENVIRONMENT FACILITY INTERACTIVE SESSION SYSTEM

(71) Applicant: Securus Technologies, Inc., Carrollton, TX (US)

(72) Inventors: Kenneth D. Johnston, Jr., Wylie, TX (US); John Mannewitz, Wylie, TX (US)

(73) Assignee: Securus Technologies, LLC, Carrollton, TX (US)

( * ) Notice: Subject to any disclaimer, the term of this patent is extended or adjusted under 35 U.S.C. 154(b) by 0 days.

(21) Appl. No.: 16/014,265

(22) Filed: Jun. 21, 2018

(51) Int. Cl.
*H04L 29/06* (2006.01)
*H04L 12/58* (2006.01)
*H04N 7/14* (2006.01)
*H04L 29/08* (2006.01)

(52) U.S. Cl.
CPC ........ *H04L 65/4053* (2013.01); *H04L 51/066* (2013.01); *H04L 63/101* (2013.01); *H04L 67/125* (2013.01); *H04N 7/147* (2013.01)

(58) Field of Classification Search
CPC . H04L 65/4053; H04L 51/066; H04L 63/101; H04L 67/125; H04N 7/147
USPC ........................................................ 709/225
See application file for complete search history.

(56) References Cited

U.S. PATENT DOCUMENTS

| | | | | |
|---|---|---|---|---|
| 4,843,377 A * | 6/1989 | Fuller | ................... | G08B 21/22 340/573.4 |
| 6,246,889 B1 * | 6/2001 | Boltz | ................. | H04M 3/4283 379/245 |
| 9,020,115 B2 * | 4/2015 | Hangsleben | ........ | H04M 3/2218 379/188 |
| 9,826,003 B1 * | 11/2017 | Thomasson | ........... | H04L 67/141 |
| 9,832,313 B1 * | 11/2017 | Way | ....................... | H04M 3/436 |
| 9,832,318 B1 * | 11/2017 | Smith | ............... | H04M 3/53366 |
| 9,912,821 B1 * | 3/2018 | Hodge | .................. | H04M 15/88 |
| 2009/0154689 A1 * | 6/2009 | Portman | ............. | H04M 3/2281 379/266.01 |
| 2011/0110507 A1 * | 5/2011 | Spiegel | ................. | H04M 15/00 379/131 |
| 2014/0155039 A1 * | 6/2014 | Kim | .................. | H04M 1/72552 455/412.1 |
| 2014/0155040 A1 * | 6/2014 | Tagg | ................. | H04M 3/42221 455/413 |
| 2014/0267540 A1 * | 9/2014 | Torgersrud | ........ | H04M 3/42374 348/14.01 |

(Continued)

*Primary Examiner* — James E Springer
(74) *Attorney, Agent, or Firm* — Fogarty LLP (57) ABSTRACT

A resident of a controlled-environment facility is provided with messaging-initiated interactive sessions. A non-resident records a message for a resident. At a later time, the resident requests use of a resident device. Use of the resident device is authorized and the resident is notified of the message from the non-resident. The message is presented to the resident for review via the resident device. If requested by the resident, approval for an interactive session between the resident and the non-resident is determined. The immediate availability of the non-resident for the requested interactive session is determined. If the non-resident is available, a request is issued to the non-resident for the approved interactive session. The non-resident may be notified of the remaining time the resident has access has access to the resident device and may be presented an option for the approved interactive session during this time window.

18 Claims, 3 Drawing Sheets

(56) References Cited

U.S. PATENT DOCUMENTS

| | | | | |
|---|---|---|---|---|
| 2015/0215254 A1* | 7/2015 | Bennett | ............ | H04L 51/12 |
| | | | | 709/206 |
| 2016/0006865 A1* | 1/2016 | Edwards | ............ | H04M 3/2281 |
| | | | | 379/114.22 |
| 2018/0308342 A1* | 10/2018 | Hodge | ............ | G08B 25/016 |
| 2019/0014062 A1* | 1/2019 | Hodge | ............ | H04L 51/043 |
| 2019/0306313 A1* | 10/2019 | Juvet | ............ | H04M 3/53366 |

* cited by examiner

CONTROLLED-ENVIRONMENT FACILITY INTERACTIVE SESSION SYSTEM

TECHNICAL FIELD

The following description relates generally to communication services provided to residents of a controlled-environment facility, and more particularly to interactive communication services provided to residents of a controlled-environment facility.

BACKGROUND OF THE INVENTION

It is estimated that over two million individuals are incarcerated in U.S. prisons and jails. In general, inmates that have been convicted of felony offenses serve longer sentences in prisons (e.g., federal or state prisons), whereas inmates that have been convicted of misdemeanors receive shorter sentences that are frequently served in local jails (e.g., county jail). In addition, upon being detained by authorities, an inmate may serve significant periods of time incarcerated in a local jail while awaiting release on bond and, in some cases, while awaiting trial. During all of these periods of incarceration, an inmate may be provided with opportunities to communicate with the outside world.

By allowing inmates to communicate with friends and family while incarcerated, the justice system aims to facilitate their transition back into society upon release. Traditional visitation sessions provided by controlled-environment facilities include telephone calls and in-person visits. More recently, technological advances have allowed controlled-environment facilities to provide various types of remote, interactive communications sessions as visitation sessions, including voice and video conferences, text communications, email and online chat sessions.

Because certain controlled-environment facilities do not allow residents to receive incoming communications, except for traditional mail, the communication services provided to residents of such controlled-environment facilities typically limits residents to placing outbound visitation session requests to non-residents of the controlled-environment facility. In addition, residents may have limited access to communication devices that may be used for participating in a visitation session. For instance, a resident may be provided limited access to a communications device according to strict visitation schedules maintained by each individual controlled-environment facility. In typical scenarios, interactive sessions between a resident and a non-resident may be scheduled for a time when the resident will have exclusive use of a communications device, but the non-resident must also be available during this brief time window in order for a communication session to be conducted.

In many instances, providing an interactive communication session between a resident and non-resident depends on the non-resident being available to receive the resident's communication request at a time the resident is afforded the brief opportunity to initiate such a request. Consequently, in many instances, a resident communication requests are unsuccessful. In scenarios where a resident is unable to establish an interactive session with a non-resident, certain controlled-environment facilities provide residents with the ability to record a voice, video or and/or text message that can be retrieved and played by the non-resident. These messages may improve the ability of the resident and the non-resident to communicate, but the limited access to visitation services by the resident nonetheless results in long delays in the messaging cycle between a resident and a non-resident. Residents of controlled-environment facilities benefit from shorter messaging cycles that allow residents regular, interactive communications with friends and family.

BRIEF SUMMARY

In various embodiments, a system provides a resident of a controlled-environment facility with messaging-initiated interaction sessions. The system may include a messaging system configured to present a message for review by the resident, wherein the message is created by the non-resident for the resident. The system may further include a resident communications system configured to: receive a request for use of a resident device by the resident; authorize use of the resident device by the resident; notify the resident of the message from the non-resident; present the message to the resident via the resident device; and determine an approval for an interactive session between the resident and the non-resident. The system may further include a non-resident availability system configured to: after the message has been presented to the resident and if the interactive session is approved, determine an availability of the non-resident for the interactive session; and if the non-resident is available, issue a request to the non-resident for the approved interactive session with the resident.

In certain additional embodiments of the system, the availability of the non-resident is determined by interfacing with a non-resident software application installed on a personal device of the non-resident, wherein the non-resident software application allows the non-resident to participate in interactive sessions hosted by the resident communications system. In certain additional embodiments of the system, the non-resident software application is configured to detect whether the non-resident is currently using the personal device. In certain additional embodiments of the system, the approval is determined based on whether the resident is allowed to participate in interactive sessions with the non-resident. In certain additional embodiments of the system, the system may further include a monitoring system configured to monitor interactive sessions, wherein determining the availability of the non-resident for the interactive session comprises determining whether the monitoring system has capacity for monitoring the interactive session between the resident and the non-resident. In certain additional embodiments of the system, the resident communications system is further configured to determine available formats for the interactive session based on a privilege status associated with the resident. In certain additional embodiments of the system, the interactive session comprises at least one of: a visitation session, a gaming session, an employment search, and an educational session.

In various additional embodiments, a method provides a resident of a controlled-environment facility with messaging-initiated interactive sessions. The method may include creating a message for the resident, wherein the message is created by the non-resident for the resident; receiving a request for use of a resident device by the resident; authorizing use of the resident device by the resident; notifying the resident of the message from the non-resident; presenting the message to the resident via the resident device; determining an approval for an interactive session between the resident and the non-resident; after the message has been presented to the resident and if the interactive session is approved, determining an availability of the non-resident for the interactive session; and issuing a request to the non-resident for the approved interactive session with the resident.

In certain additional embodiments of the method, the availability of the non-resident is determined by interfacing with a non-resident software application installed on a personal device of the non-resident, wherein the non-resident software application allows the non-resident to participate in interactive sessions hosted by the resident communications system. In certain additional embodiments of the method, the non-resident software application is configured to detect whether the non-resident is currently using the personal device. In certain additional embodiments of the method, the approval is determined based on whether the resident is allowed to participate in interactive sessions with the non-resident. In certain additional embodiments, the method may further include determining the availability of the non-resident for the interactive session comprising determining whether a monitoring system has capacity for monitoring the interactive session between the resident and the non-resident. In certain additional embodiments, the method may further include determining available formats for the interactive session based on a privilege status associated with the resident. In certain additional embodiments, the method may further include determining available formats for the interactive session based on one or more capabilities of the resident device.

In various additional embodiments, a computer-readable storage device has program instructions stored thereon for providing a resident of a controlled-environment facility with interactive services. Upon execution by one or more processors, the program instructions cause the one or more processors to: present a message for the resident, wherein the message is created by the non-resident for the resident; receive a request for use of a resident device by the resident; authorize use of the resident device by the resident; notify the resident of the message from the non-resident; present the message to the resident via the resident device; determine an approval for an interactive session between the resident and the non-resident; after the message has been presented to the resident and if the interactive session is approved, determine an availability of the non-resident for the interactive session; and issue a request to the non-resident for the approved visitation session with the resident.

In certain additional embodiments of the computer-readable storage device, the availability of the non-resident is determined by interfacing with a non-resident software application installed on a personal device of the non-resident, wherein the non-resident software application allows the non-resident to participate in interactive sessions hosted by the resident communications system. In certain additional embodiments of the computer-readable storage device, the non-resident software application is configured to detect whether the non-resident is currently using the personal device. In certain additional embodiments of the computer-readable storage device, the approval is determined based on whether the resident is allowed to participate in visitation sessions with the non-resident. In certain additional embodiments of the computer-readable storage device, determining the availability of the non-resident for the session comprising determining whether a monitoring system has capacity for monitoring the session between the resident and the non-resident. In certain additional embodiments of the computer-readable storage device, the program instructions further cause the one or more processors to determine available formats for the interactive session based on a privilege status associated with the resident.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art would be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), certain healthcare facilities (e.g., certain hospitals and nursing homes, certain mental health facilities, certain rehabilitation facilities, such as drug and alcohol rehabilitation facilities, etc.), certain restricted living quarters (e.g., barracks, certain dormitories, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, offenders or detainees. It should be understood, however, that the systems and methods described herein may be similarly applicable to other types of controlled-environment facilities and their respective residents (e.g., a hospital and its patients, a school dormitory and its students, etc.).

As described, limited access to communication devices and visitation services by residents may limit the ability of residents to successfully establish communication sessions with non-residents. Residents may be allowed access to communication devices according to strict visitation schedules that may not correspond to days and times during which friends and family members of the resident are regularly available to participate in a visitation session. In addition, a friend and family member may want to accept an incoming request for a visitation session from a resident, but may require time to move to a more private location and cannot otherwise accept the request for an immediate visitation session. In order to support increased communications between residents and non-residents and to take advantage of opportunities when a resident has access to a communications device and the non-resident appears to be available for a visitation session, a resident communications system, such as described with regard to FIG. 1, may be configured to implement the described messaging-initiated visitation sessions.

Figure 1:
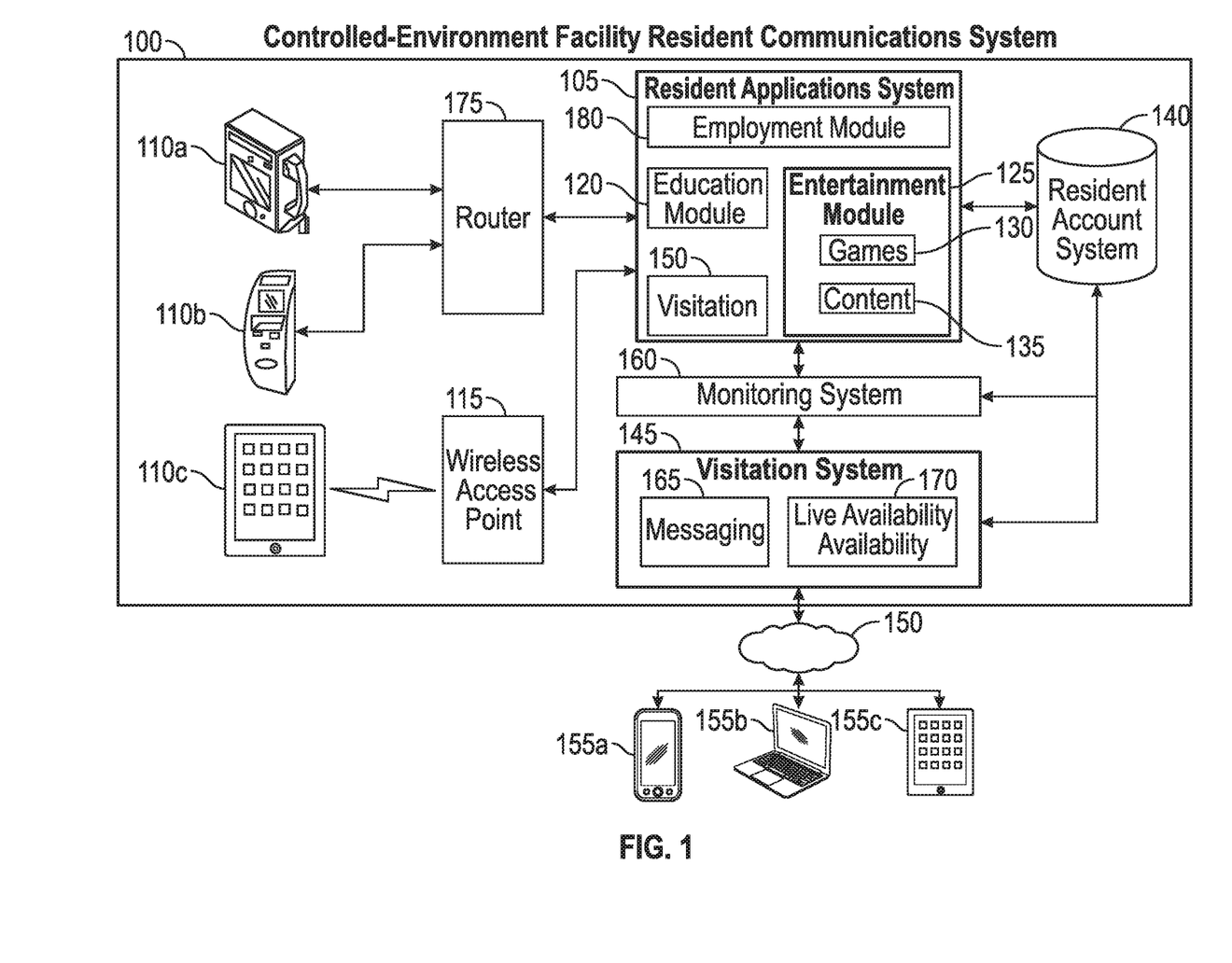
FIG. 1 is a diagram illustrating certain components of a communication system for providing residents of a controlled-environment facility with messaging-initiated interactive sessions according to various embodiments.

FIG. 1 is a diagram illustrating certain components of a resident communications system 100 provided within a controlled-environment facility and configured according to various embodiments for providing residents with messaging-initiated interactive sessions. In a controlled-environment facility, the resident communications system 100 may provide residents with a variety of services. In certain instances, the resident may utilize the services provided by the resident communications system 100 via a resident communications device 110a-c. In the illustrated embodiment, resident communications system 100 provides residents with visitation session services via a visitation system 145, where the resident may utilize certain of these visitation session services via supported resident communications devices 110a-c, that may include a resident terminal 110a, a resident kiosk 110b and/or a portable communications device 110c. As illustrated, resident communications system 100 also provides residents with access to a resident applications system 105 that interfaces with the resident communications device 110a-c in order to provide various approved software applications to the resident, such as educational, employment, visitation and entertainment software. In various embodiments, resident communications system 100 may provide residents with a variety of additional services via a resident communications device 110a-c.

In certain embodiments, resident communications system 100 may be located within a controlled-environment facility, and may be used to provide communications services to residents located at that particular facility. Alternatively, resident communications system 100 may be centrally and/or remotely located with respect to one or more controlled-environment facilities and be used to provide services to residents at multiple different facilities. Whether local to a particular controlled-environment facility or located remotely, resident communications system 100 may be used to provide communication services to residents of multiple controlled-environment facilities.

One of the services provided to residents by the resident communications system 100 may include monitored interactive sessions. For instance, in the illustrated embodiment, visitation system 145 allows a resident, using resident communications device 110a-c, to participate in a monitored visitation session with a non-resident participating via a personal communications device 155a-c that connects to the visitation system 145 via an external network 150, such as the Internet. In various embodiments, the visitation system 145 may provide residents with a selection of different visitation session formats including audio conferences, audio messages, video conferences, video messages, email, online chats and/or text messaging services. In certain instances, the visitation formats that are available to a resident may depend on factors such as: the capabilities of the resident communications device 110a-c, the resident's designated privilege and/or risk classification within the controlled-environment facility, and restrictions on types of visitations that are allowed with specific non-residents.

In the illustrated embodiment, various components of the resident communications system 100 utilize the resident account system 140 in enforcing security protocols that are applicable to the use of services provided to residents of the controlled-environment facility. For instance, in providing visitation services, the visitation system 145 may determine applicable restrictions based on data stored in the resident account system 140. In certain embodiments, the visitation system 145 may interoperate with the resident account system 140 to limit a resident's visitation sessions to sessions with non-residents whose identities are listed in that resident's Pre-Approved Contact (PAC) and/or Personal-Allowed Number (PAN) list. In some scenarios, the visitation system 145 may also enforce restrictions prohibiting a resident from contacting certain individuals identified in a "do not contact" list. The identity of a non-inmate may be represented on these lists by the phone number of the non-resident, the device presented for use by a non-resident and/or the email addresses or other accounts used by the non-resident. Each resident's PAC, PAN, and/or do not contact list(s) may be stored by the resident account system 140. In certain scenarios, resident account system 140 may also be used to store biometric information used to authenticate individual residents of the controlled-environment facility and/or non-residents that have been authorized for certain visitation system 145 services. In addition to PAC, PAN, and/or do not contact list(s), resident account system 140 may also store other security profiles and rules that are applicable to each resident.

In certain embodiments, certain of the restrictions maintained in the resident account system 140 may limit the availability of certain types of visitation sessions between a resident and a non-resident. For instance, the availability of the described messaging-initiated interactive sessions may be limited to residents that have been assigned low-risk privilege status classifications within the controlled-environment facility. Conversely, high-risk classification residents may be denied access to the messaging-initiated visitation sessions, or may be limited to participating via certain interactive formats. In order to support as may messaging-initiated interactive sessions as possible with available monitoring resource, certain embodiments may utilize for less rigorous monitoring procedures for interactive sessions involving lower-risk residents.

For instance, in certain embodiments, monitoring system 160 may be configured to utilize less stringent security procedures during messaging-initiated interactive sessions, thus allowing the monitoring system 160 to support additional simultaneous interactive sessions. For example, messaging-initiated interactive sessions may be conducted without the monitoring system 160 utilizing certain scanning tools, such as keyword detection and behavioral monitoring tools that may be used to monitor emotional physiological states of the resident utilizing the resident communications device 110a-c. In other embodiments, the monitoring system 160 may enforce less stringent security procedures during certain types of messaging-initiated interactive sessions. For instance, a resident that is scheduled for release or that has been authorized to participate in a work-release program may be authorized to utilize certain employment services provided by the resident applications system 105, such as employment search and application services provided by employment module 180. In such scenarios, use of employments services provided via the employment module 180 may be provided with minimal monitoring in order to facilitate use of such employment services.

Where less stringent monitoring is utilized, messaging-initiated interactive sessions may be limited to use by lower-risk residents. In certain embodiments, the reduced security procedures may limit the availability of messaging-initiated interactive sessions to specific non-residents identified on a PAN or PAC list associated with a particular resident. Such non-residents are typically pre-approved for various interactive visitation formats with a resident. Conversely, the limited security procedures may result in messaging-initiated interactive sessions being unavailable with regard to specific non-residents, such as known criminal affiliates and individuals suspected of engaging in authorized activities with the resident or with other residents.

The resident account system 140 may also be used to manage information such as balances in a resident's trust, commissary and/or visitation services accounts. The resident account system 140 may also provide access to other information pertaining to a resident, including for instance a resident's trial schedule, conviction data, criminal record, sentencing data (such as time served, time remaining to be served, and projected release date), counseling history, screening history, cell and cellmate assignments, resident-specific restrictions and warnings, commissary order history, telephone call history, call recordings, known or suspected gang or criminal affiliations, known or suspected affiliates, accomplices, or gang members, and any other information that may be relevant or useful to correctional facility staff to house and maintain residents. In various embodiments, the resident account system 140 may be one or more separate systems, or may be integrated as a component of the resident communications system 100.

Subject to various restrictions and limitations enforced by the visitation system 145, residents may participate in visitation sessions with one or more non-residents 155a-c. Non-residents may utilize various communications devices in participating in visitation sessions. For instance, a non-resident may participate using a mobile phone 155a, tablet computing device 155c, a personal computer 155b or other communications device capable of interfacing with the visitation system 145. In certain scenarios, a non-resident may participate in a voice visitation session hosted by the visitation system 145 via a traditional telephone via a Publicly Switched Telephone Network (PSTN) interface to the network 150. As described, various other visitation session formats may be supported by visitation system 145. Based on the hardware and software capabilities of the non-resident devices 155a-c, non-residents may participate in voice, video and/or text-based (e.g., text messages, chat, email) visitation sessions.

In certain embodiments, the personal devices of the non-residents 155a-c may utilize software applications configured to interoperate with certain applications of the resident communications system 100. For instance, a non-resident may register a personal device 155a-c for use of interactive services provided by resident communications system 100, where the registration of the personal device 155a-c includes installation of a software application on the non-resident's personal device 155a-c. In certain embodiments, the software application installed on the personal device 155a-c of the non-resident may be a mobile device app configured to interface with applications of the resident communications system 100 that have been configured for interactive sessions in which a non-resident may participate via a personal device 155a-c. In such embodiments, the mobile device app may provide the non-resident with capabilities for requesting and participating in interactive sessions hosted via the resident communications system 100. As described in additional detail, in certain embodiments, the mobile device app may be used to assist the non-resident in successfully establishing live messaging-initiated interactive sessions with the resident.

As described, resident communications system 100 includes a monitoring system 160 configured to perform various monitoring operations related to the resident's use of the services provided by the system. In particular, the monitoring system may provide the ability to monitor a resident's use of software applications provided via the resident applications system 105. The monitoring system 160 may also include various tools for automated and manual monitoring of visitation sessions conducted via the visitation system 145. For instance, the monitoring system 160 may include tools that allow staff to monitor live and recorded visitation sessions. The monitoring system 160 may record the visitation sessions conducted via the visitation system 145, such as by generating written transcripts, audio and/or video files of visitation sessions. These recorded visitation sessions may be stored to a database maintained by the monitoring system 160. The monitoring system 160 may also provide tools that allow staff to mark and annotate events observed in a recorded visitation session. The monitoring system 160 may also provide tools that allow staff to search recorded visitation sessions in support of investigative activities. Additional monitoring may be provided by the monitoring system 160 via keyword detection, gesture recognition, and other tools intended to detect unauthorized or illicit behavior during a visitation session.

In certain embodiments, the monitoring system 160 may be configured to provide monitoring for various types of interactive session in addition to visitation sessions. For instance, the monitoring system 160 may monitor a non-resident's interactive participation in an employment search and/or application session. For instance, as with a visitation session, the monitoring system 160 may monitor any audio or video streams utilized in an education session. In addition, monitoring system 160 may monitor any text information shared between a resident and non-resident during an employment session, such as the text of a resume or job application that is being drafted by the resident with the assistance of the non-resident. The monitoring system 160 may be similarly configured to monitor other interactive sessions such as gaming sessions. Any audio and video shared with a non-resident during a gaming session may be analyzed similar to a visitation session. In addition, any text comments shared during a gaming session, such as via a chat feature of a game, may also be analyzed by the monitoring system 160 for unauthorized activity.

In certain embodiments, resident communications device 110a-c may be a personal wireless device 110c, such as a tablet device or a smartphone device. As described in additional detail with regard to the embodiment of FIG. 2, the portable communications device 110c may include a camera, display, microphone and speakers and may allow the resident to participate in interactive sessions supported by the resident communications system 100, where such interactive sessions may include voice calls, video conferences, email, online chats and/or text messaging services. In certain scenarios, a portable communications device 110c may be referred to as an Intelligent Resident Device (IRD), or in a correctional institution environment, as an Intelligent Inmate Device (IID). In certain scenarios, a portable communications device 110c may be sponsored, or otherwise subsidized, by organizations or companies that have contracted with the controlled-environment facility to provide services to residents of the facility.

The portable communications device 110c may be especially adapted in various manners for use in a controlled-environment facility. For instance, in a correctional facility, the portability of a portable communications device 110c may be limited by mounting or otherwise attaching the device on a wall, within a booth or as part of a kiosk. As described in additional detail with regard to the embodiment of FIG. 2, the portable communications device 110c may include various adaptations that prevent unauthorized use of the device by residents. Such adaptations may include various restrictions on the resident's use of services provided by the resident communications system 100, including the restrictions on the availability of certain formats of messaging-initiated interactive sessions. The portable communications device 110c may be assigned for use by a resident on a temporary or permanent basis.

A portable communications device 110c may be restricted with respect to the network connectivity that is provided by the resident communications system 100. In many scenarios, a portable communications device 110c may be configured to connect only to a specific wireless access point 115, or a specific network of wireless access points, provided by the resident communications system 100. In certain embodiments, a portable communications device 110c may be further restricted to connect only to networks available within certain areas of a controlled-environment facility, such as a dedicated visitation area or other supervised area. In certain scenarios, network connectivity for a portable communications device 110c may be limited by placing wireless access points 115 and positioning directional antenna within the physical structure of a controlled-environment facility such that the generated wireless signals are restricted to limited areas within the facility.

In certain embodiments, resident communications device 110a-c may be a resident terminal 110a. As with the portable communications device 110c, the resident terminal 110a may provide residents of a controlled-environment facility with voice, video and/or text interactive services. In certain scenarios, the resident terminal 110a may be mounted on a wall, within a booth, or as part of kiosk. In certain scenarios, the resident terminal 110a may be a hardened terminal and may be installed in an area of the controlled-environment facility 110 dedicated to providing residents with interactive sessions. In certain embodiments, resident terminal 110a may include a character-entry interface that allows data entry by residents and also allows residents to participate in text messaging or other text-based communication services. In certain embodiments, such a resident terminal 110a may be referred to as an Intelligent Facility Device (IFD).

In various embodiments, a resident terminal 110a may include a video display, a camera, and a handset that includes a microphone and speakers. The display may be any suitable electronic display such as, for example, a Liquid Crystal Display (LCD) or a touchscreen display (e.g., resistive, capacitive, etc.). The camera included on the resident terminal 110a may be any suitable imaging device such as, a video camera or webcam equipped with Charge-Coupled Devices (CCDs) or Complementary Metal-Oxide-Semiconductor (CMOS) active pixel sensors. A handset may be similar to a traditional telephone handset, including an earpiece portion (with a speaker), a handle portion, and a mouthpiece portion (with a microphone). In certain embodiments, the resident terminal 110a may allow a resident to utilize a headset with earphones and a microphone in place of a traditional handset.

In certain embodiments, resident communications device 110a-c may be a resident kiosk 110b. As with the portable communications device 110c and the resident terminal 110a, the resident kiosk 110b may provide residents of a controlled-environment facility with voice, video and/or text communications services. In certain scenarios, the resident kiosk 110b may be located within a booth or other visitation area. The resident kiosk 110b may be formed from a hardened enclosure. In certain embodiments, resident kiosk 110b may include a keyboard or other character-entry interface that allows data entry and participation in text-based communication services. As with the resident terminal 110a, a resident kiosk 110b may include a video display, a camera, a microphone and speakers that may provide residents with the ability to participate in interactive sessions supported by the resident communications system 100, where such interactive sessions may include voice calls, video sessions, email, online chats and/or text messaging services.

As illustrated in FIG. 1, the resident terminal 110a and resident kiosk 110b may be coupled to the resident applications system 105 via one or more routers 175. In other embodiments, the resident terminal 110a and resident kiosk 110b may be coupled to the resident applications system 105 via one or more additional network devices in addition to router 175. In certain embodiments, each resident terminal 110a and resident kiosk 110b may be coupled to a router 175 via a network cable, where the router 175 and network cable are secured from being accessed by residents.

As illustrated, the resident applications system 105 includes an education module 120, an employment module 180 and an entertainment module 125. These modules include software applications provided for use by residents and which may be utilized via a resident communications device 110a-c. The education module 120 may be one of many different modules provided for the education and training of residents. For instance, the education module 120 may provide a resident with access to recorded lectures, online classes, coursework materials, self-guided training courses, vocational training materials, job counseling services, job search services, and other such resources provided with the intent to rehabilitate and educate residents.

As described, in certain scenarios, an employment module 180 may provide residents scheduled for release, or for participation in a work-release program, with employment search and application services. In certain embodiments, employment module 180 may provide residents with the ability to search for opportunities for employment outside of the controlled-environment facility. In addition, employment module 180 may provide residents with tools and resources for applying for job openings, such as completing application forms, drafting a resume and requesting letters of recommendation. Certain aspects of the employment module 180 may be configured for use within interactive sessions with non-residents.

For instance, a non-resident utilizing a personal device 110a-c configured with a software application that supports interoperation with the resident communications system 100 may participate in certain interactive employment module 180 functions, such as assisting a resident with researching job openings and drafting a resume. In various embodiments, interactive employment services provided by the employment module 180 may allow non-residents to participate in a resident's employment search via screen-sharing in conjunction with a voice call. Embodiments may also allow a non-resident to participate directly by editing and drafting employment search documents such as resumes, requests for letters of recommendation and job applications.

In addition to providing access to educational and employment resources, the resident applications system 105 may include an entertainment module 125, by which entertainment software programs may be downloaded and run on a resident communications device 110a-c. In the illustrated embodiment, entertainment module 125 is comprised of a gaming module 130 and content module 135. The gaming module 130 may support the use of various games approved for residents of a controlled-environment facility. In certain scenarios, residents with particular privilege status classifications may be allowed access to certain games that are otherwise unavailable to other residents. The entertainment module 125 also includes a content module 135 that may be used to provide residents with various forms of digital content, such as recorded videos, live broadcasts, music files, access to streaming audio, and other audio and video content approved for residents of a controlled-environment facility. In certain embodiments, the content available to a particular resident may depend on a privilege status classification of the resident. For instance, residents having earned additional privileges and/or a low-risk classification may be allowed access to additional content via content module 135.

In certain embodiments, aspects of the entertainment module 130 may allow interactive non-resident participation, such as via a software application installed on the personal device 110a-c of the non-resident. For instance, the gaming module 130 may provide residents with access to games that support interactive participation by non-residents. In certain embodiments, the interactive gaming sessions hosted by the gaming module 130 may allow direct participation by a non-resident in certain games, thus allowing the non-resident to participate in a game in conjunction with a resident. Embodiments may instead restrict non-residents to viewing on a live stream of a resident's gaming session hosted by the gaming module 130 and interacting with the resident via text and voice communication sessions hosted simultaneously with the gaming session.

As described, resident communications system 100 may provide residents with a selection of different interactive sessions. In addition, the visitation system 145 may include a message service 165 that provides residents with messaging services according to various embodiments. In certain embodiments, the message service 165 may provide messaging capabilities by which a non-resident and a resident may record voice, video or text messages for each other. The resident communications system 100 may also utilize a live availability module 170 that is configured to determine the availability of a non-resident for an immediate live interactive session with the resident. As described in additional detail with regard to the embodiment of FIG. 3, a resident may be provided with the ability to query the immediate availability of a non-resident for an interactive session in response to a message from the non-resident. By limiting such interactive availability features to responses to messages from a non-resident, the resident has an ability to attempt an immediate, or near immediate, interactive session with a non-resident that has indicated an interest in communicating with the resident. In this manner, the capabilities provided by the live availability module 170 facilitate the resident communications system 100 in successfully establish live interactive sessions during the limited periods of visitation that are allowed to a resident, while preventing the resident from initiating unsolicited communications.

In the embodiment of FIG. 1, the resident application system 105 is a component of the resident communications system 100. In certain embodiments, the resident application system 105 may be an external component of the resident communication system 100. In certain embodiments, one or more of the functions of the resident application system 105 may be provided by systems external to the resident communications system 100. In certain of such embodiments, one or more of the functions of the resident application system 105 may be provided by centralized systems external to the controlled-environment facility.

Figure 2:
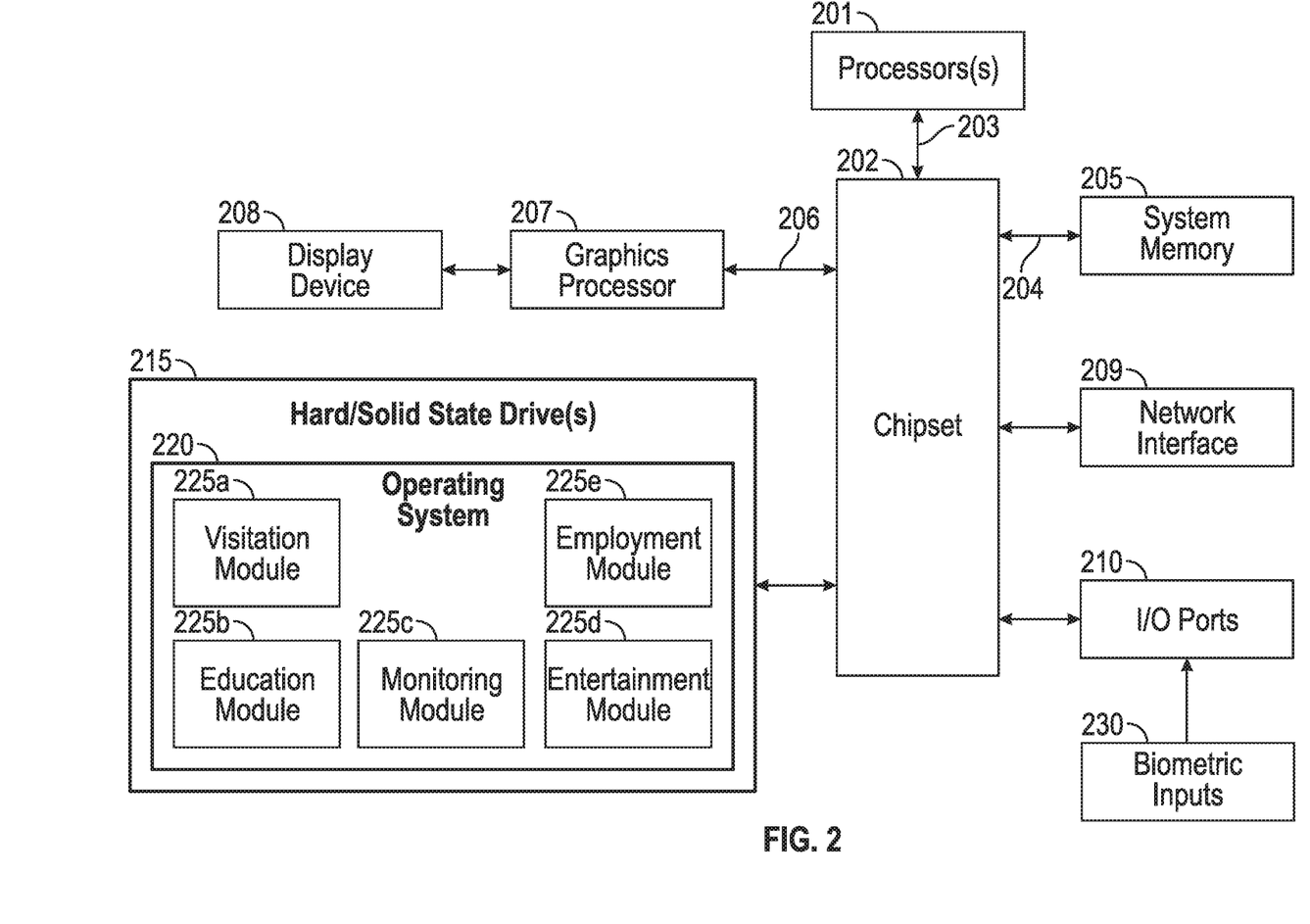
FIG. 2 is a diagram illustrating certain components of a resident device for providing residents of a controlled-environment facility with messaging-initiated interactive sessions according to various embodiments.

FIG. 2 is a block diagram of a communications device 200 configured according to certain embodiments for use by a resident of a controlled-environment facility. In various embodiments, the communications device 200 may correspond to a resident terminal 110a, a resident kiosk 110b, or a portable communications device 110c, such as described with respect to FIG. 1. In certain scenarios, the communications device 200, such as resident terminal 110a, resident kiosk 110b and portable communications device 110c, allows residents to utilize various services provided by a resident communications system, such as described with respect to FIG. 1. The communications device 200 may be configured to interoperate with the resident communications system to utilize software applications that have been approved, and in some cases modified, for use by residents of a controlled-environment facility. Also as described with regard to FIG. 1, in certain embodiments, the resident communications system may be configured such that the resident may utilize the communications device 200 to participate in games, employment searches, education sessions and visitation sessions, including text, audio and/or video visitation sessions.

In various embodiments, the communications device 200 may be installed within a hardened enclosure that prevents any modifications to the hardware of the device and to prevent any tampering with the device that could allow a resident to conceal contraband within the device. In certain embodiments, the communications device 200 may be a tablet device, such as portable communications device 110c, that is protected within a hardened case that allows the resident to handle and use the portable device, but prevents the resident from accessing any of the device's internal components.

In certain embodiments, one or more sensors may be integrated into the communications device 200 in order to detect any such attempts to compromise the enclosure of the device. In certain embodiments, the communications device 200 may be configured to issue an alert to the resident communications system if the sensors indicate any attempts by a resident to compromise the enclosure of the device. In certain embodiments, the communications device 200 may be configured to shut down upon the sensors detecting an attempt to compromise the device, or in response to the sensors detecting sudden movements indicative of a resident's rough handling of the device. Various additional features of the hardware and/or software of the communications device 200 may be modified in order to prevent unauthorized use of the device.

Communications device 200 may include one or more processors 201. In various embodiments, the communications device 200 may be a single-processor system including one processor 201, or a multi-processor system including two or more processors 201. Processor(s) 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

Communications device 200 may include a chipset 202 that may include one or more integrated circuits that are connected to processor(s) 201. In certain embodiments, the chipset 202 may utilize a QPI (QuickPath Interconnect) bus 203 for communicating with the processor(s) 201. Chipset 202 provides the processor(s) 201 with access to a variety of resources. For instance, chipset 202 provides access to system memory 205 over memory bus 204. System memory 205 may be configured to store program instructions and/or data accessible by processors(s) 201. In various embodiments, system memory 205 may be implemented using any suitable memory technology, such as static RAM (SRAM), synchronous dynamic RAM (SDRAM), nonvolatile/Flash-type memory, or any other type of memory.

Chipset 202 may also provide access to a graphics processor 207. In certain embodiments, graphics processor 207 may be comprised within a video or graphics card that has been installed as components of the portable communications device 200. Graphics processor 207 may be coupled to the chipset 202 via a graphics bus 206 such as provided by an AGP (Accelerated Graphics Port) bus, a PCIe (Peripheral Component Interconnect Express) bus. The graphics processor 207 generates display signals that are provided to a display device 208, such as a tablet display screen. In certain embodiments, the display device 208 may be a touchscreen display configured to receive manual inputs, such as finger gestures and/or stylus inputs.

The chipset 202 of the communications device 200 may also include one or more hard disk and/or solid-state drives 215. As illustrated, the operating system 220 of the communications device 200 may be stored in the hard disk and/or solid-state drive 215. The communications device 200 may be configured to operate using a specially-adapted operating system 220, or operating system kernel, that implements various security procedures, such as the described authentication of the resident using a voice print, fingerprint or other biometric input recognition. The operating system 220 of the communications device 200 may also restrict the software applications and services that may be used by a resident. The operating system 220 may also be configured to prevent the resident from installing or modifying any applications on the device, thus limiting the resident to the use of software programs authorized for use by the resident communications system.

In certain embodiments, chipset 202 may be coupled to a network interface 209, such as provided by a Network Interface Controller (NIC). In certain embodiments, the network interface 209 may be coupled to the chipset 202 via a PCIe bus. As described, a communications device 200 such as portable communications device 110c, may be limited with regard to the network connectivity that is supported by the device. In such embodiments, the network interface 209 may be configured to restrict the wireless networks to which a portable communications device may be connected. For instance, network interface 209 may be a wireless network adapter that is configured to allow the communications device 200 to connect only to a specific wireless network provided by the resident communications system. In certain embodiments, network interface 209 may be configured to issue and alert notifying the resident communications system if any unrecognized wireless networks are detected by the communications device 200.

In many scenarios, use of a communications device 200 may be limited based on security protocols implemented by the resident communications systems. For instance, the operating system 220 of the communications device 200 may be configured to require a resident to enter a PIN (Personal Identification Number) assigned to the resident before enabling use of the communications device 200 by the resident. In other embodiments, the communications device 200 may likewise remain disabled until a resident trying to use the device is authenticated via a biometric verification. In certain embodiments, the communications device 200 may be configured to disable certain functions of the device or of the resident software applications installed on the device until the resident is authenticated, such as using voice print recognition of a voice sample provided by the resident in response to a prompt generated by the operating system 220. In the illustrated embodiment, the chipset 202 is configured to utilize I/O ports 210 that support biometric input devices 230, such as a fingerprint reader or a retinal scanner. In certain embodiments, the operating system 220 may boot upon initialization of the communications device 200, but may require authentication of the resident via biometric inputs 230 in order to enable the resident's use of the communications device 200.

In certain embodiments, a communication device 200, such as the resident terminal 110a or a kiosk 110b, may include an I/O port 210 input coupled to an RFID (Radio Frequency Identification) reader that is configured to detect RFID transponders worn by residents of the controlled-environment facility. The incorporation of the RFID reader into the communication device 200 provides the ability to authenticate an inmate using the communications device 200. In certain embodiments, the RFID reader may be configured receive reports of biometric information collected from sensors included in the RFID transponder device worn by a resident.

As described with respect to FIG. 1, the resident communications system may support the use of resident applications, such as the education module 120, employment module 180 and the entertainment module 125, which may be downloaded and run on the communications device 200. Referring to FIG. 2, upon booting of the communications device 200, and upon instantiation and execution of the operating system instructions 220 stored in the storage drive 215, the operating system 220 provides the resident with access to various software modules 225a-e. Each of the software modules 225a-e may be installed on the communications device 200, but may remain fully or partially disabled until the resident has been approved to use the restricted software components.

The software modules supported by operating system 220 may include an education module 225b that provides residents with access to various educational services and resources. These educational services and resources provided via the education module 225b may include various forms of instructional materials, course materials, self-guided learning exercises, access to online classes, training materials, and/or vocational training exercises. In various embodiments, the services provided via the education module 225b may provide residents with various types of resources that promote the education of the resident. The software modules supported by operating system 220 may also include an entertainment module 225d that may provide a resident with access to games and content, as described with respect to the entertainment services in FIG. 1.

The employment module 225e may provide a resident scheduled for release with tools by which the resident may search employment opportunities. In addition, employment module 225e may provide residents with tools and resources allowing use of a communication device 200 by a resident to apply for job openings, such as completing application forms, drafting a resume and requesting letters of recommendation. In certain embodiments, the employment module 225e may also allow interactive participation by a non-resident, such as providing a collaborative workspace allowing a non-resident and a resident to jointly edit and draft employment search documents such as resumes, requests for letters of recommendation and job applications.

The software modules supported by operating system 220 may also include a visitation module 225a that may provide the resident with the ability to participate in visitation sessions, such as the visitation sessions described with respect to FIG. 1. In certain embodiments, the visitation module 225a may provide residents with ability to request, schedule and participate in visitation sessions, such as voice calls, text communications and video conferences. In such embodiments, the visitation module 225a may include user interface elements that allow the resident to interface with the visitation system 145 and the resident account system 140 in performing visitation functions such as requesting a visitation session, determining whether the requested visitation is allowed and scheduling a visitation session. The visitation module 225a may also include audio and video capabilities that allow the resident to participate in audio and video visitation sessions. Embodiments of the visitation module 225a may also enable residents to participate in other types of visitations, such as e-mail, text messaging and the exchange of voice and video messages.

Once a resident using the communication device 200 has been properly authenticated, the resident may utilize features of the operating system 220 to request access to the supported software modules 225a-e. In certain embodiments, the operating system 220 may connect the resident to the resident applications system 105 of FIG. 1 in order to authorize a resident's use of a requested module or feature. In various embodiments, a communications device 200 does not include each of the components shown in FIG. 2.

In various embodiments, communications device 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as a systems-on-a-chip.

Figure 3:
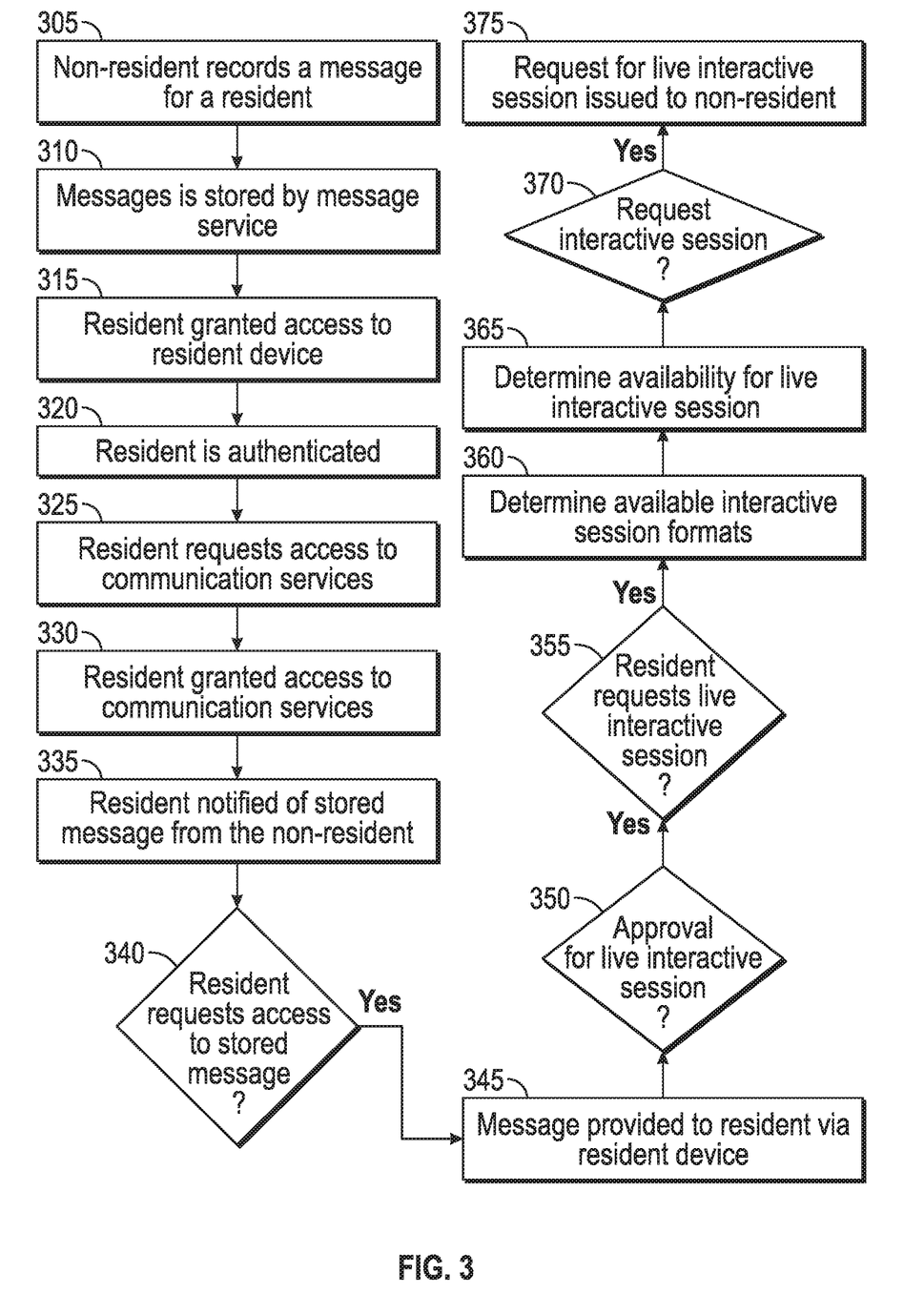
FIG. 3 is a flowchart diagram illustrating certain steps of process according to various embodiments for providing a resident of a controlled-environment facility with messaging-initiated interactive sessions.

FIG. 3 is a flowchart diagram illustrating certain steps of a process for providing messaging-initiated interactive sessions according to various embodiments. In the illustrated embodiment, the process begins at step 305 with a non-resident recording a message for a resident of a controlled-environment facility. As described, residents may be prohibited from receiving inbound communications from non-residents. Additionally, residents may be provided limited access to interactive services that may not correspond with time periods of typical availability of friends and family members. Accordingly, as described, in certain embodiments the interactive system provided by the controlled-environment facility may allow non-residents to record messages that may be accessed by a resident the next time the resident is granted access to a resident communications device.

In certain embodiments, the non-resident may be allowed to record audio message for a resident. Other embodiments may support recording video messages for a resident. Embodiments may also support various types of text-based messages, such as emails SMS (Short Message Service) text messages, for delivery to residents. In certain embodiments, the supported messaging capabilities for non-residents may be provided via a messaging interface, such as an interface provided by the messaging module 165 of the visitation system 145, as described with regard to FIG. 1. For instance, the messaging capabilities of the visitation system may include a user interface by which non-residents may record an audio or video message for a specified resident. The user interface of the messaging system may also provide non-residents with an interface for entry of text-based messages. In certain embodiments, the messaging system may interoperate with one or more external services for receipt of various types of audio, video and text messages from non-residents, such as emails, text messages, voicemail and video messages.

In certain scenarios, a message from a non-resident may be recorded at step 305 in response to a message from a resident. For instance, the visitation system may provide residents with the ability to record messages for delivery to a non-resident. Upon a message being recorded by the resident, a notification may be generated and delivered to the non-resident. After the non-resident has accessed the recorded message, the non-resident may be provided with the option to record a reply message to the resident. In another scenario, the message from a non-resident may be recorded in response to a notification generated automatically by the resident communications system, such as a notification of the resident's detainment at the controlled-environment facility.

As described with regard to the personal communication devices 155a-c utilized by non-residents in FIG. 1, the visitation system may be configured to interoperate with a software application installed on the personal device of the non-resident, such as a mobile device app that is supported by the visitation system. In such embodiments, the non-resident may utilize features of the mobile device app installed on their personal device in order to record a message for delivery to a resident, where the message may be an audio, video, or text-based message. In certain embodiments, the mobile device app may allow the non-resident to designate an availability status with a message recorded for a non-resident. The designated availability status may specify whether the non-resident should be designated as available for an immediate, or near immediate, live interactive session in response to the resident accessing the recorded message.

At step 310, the message from the non-resident is stored by the message service. In many instances, a recorded message is not immediately deliverable due to various restrictions that limit a resident's access to interactive services, such as limited access to the resident communication devices and the requirement to scan messages for illicit or suspicious activities. Accordingly, upon being stored by the message service, messages from non-residents may be analyzed for unauthorized or suspicious content by the monitoring system 160. In certain instances, messages containing unauthorized or suspicious content may be flagged by the monitoring system such that an alert is indicated when the resident accesses a flagged message. The alert mechanism provides investigators with the opportunity to observe the resident's response to the flagged message.

In the described scenarios, the message recorded by the non-resident cannot be delivered immediately to the resident. At some point after the message has been scanned and stored, at step 315, the resident is granted access to a resident communications device that is capable of allowing the resident to access the recorded message and to participate in visitation services. For instance, the resident may be provided access to a visitation or common area according to a visitation schedule, where the visitation area includes resident communication devices that are available to the resident. As described regard to FIG. 1, the resident may be provided access to a resident terminal 110a or a kiosk 110b that is located within a designated visitation area of a controlled environment facility. The resident may also be provided access to a mobile resident device 110c on a temporary or long-term basis. In scenarios where the resident has access to a mobile resident device, access to visitation services may nonetheless be disabled outside of designated visitation hours.

At step 320, the resident seeking access to the resident communications device is authenticated. As described with regard to FIG. 2, a resident communications device may be configured to require various biometric inputs from a resident in order to positively identify the resident seeking use of a resident communications device. The operating system of the resident communications device may implement various other authentication procedures prior to allowing a resident to access the communication services provided via the device. In certain embodiments, the resident communication device may interface with the resident account system 140 in determining whether to grant access to the device and in determining the features of the device to be made available to a particular resident.

Upon being authenticated, at step 325, the resident may request access to the various communication services provided via the resident device and the resident communication system. For instance, the resident may request access to educational, employment and entertainment services offered via the resident device. The resident may also request access to visitation services, if visitation services are provided to the resident at that time. In certain instances, a resident may be allowed access to applications that are local to the resident device, such as certain games and education software, but are blocked from visitation services that typically require significantly more bandwidth and require monitoring resources. At step 330, the resident is granted access to the requested communications services and begins use of the resident device. During the resident's use of the resident device, at step 335, the resident is notified of the message recorded by the non-resident. The notification may be issued via a feature of the visitation module of the resident device, such as a pop-up dialog or a push notification. In certain embodiments, the notification may include a link directing the resident to the recorded message from the non-resident.

In response to the message notification, at step 340, the resident determines whether to access the message from the non-resident. In certain scenarios, the resident may wish to defer accessing the message until a later time, or may not wish to receive a message from a particular non-resident. If the resident chooses to access the message, at step 345, the message is provided to the resident via the resident device. The visitation module of the resident device may be configured to access the message and provide the message to the resident via the appropriate video/audio player or text-based messaging applications supported by the resident device.

In certain embodiments, while the resident is accessing the message from the non-resident, at step 350, the visitation system may determine whether a live interactive session between the resident and the non-resident is approved. If approved, an interactive session between the resident and the non-resident is available immediately, without having to request or schedule a visitation session. As described, the availability of such interactive sessions may be restricted to certain low-risk classifications of residents. Also as described, the availability of messaging-initiated interactive sessions may also depend on the availability of monitoring capabilities for handling an additional ad hoc visitation session between the resident and the non-resident. The availability of messaging-initiated interactive sessions may also be restricted based on the identity of the non-resident that recorded the message for the resident. Certain embodiments may limit messaging-initiated interactive sessions to certain preapproved non-residents, or may specifically restrict messaging-initiated interactive sessions with certain non-residents. Various additional criteria, and combinations of the described criteria, may be utilized in order to determine whether a live interactive session is approved for immediate use by the resident and the non-resident.

In certain embodiments, an interactive session may be offered contingent on the availability of funds to pay any fees associated with the interactive session. For instance, non-resident participation in certain interactive sessions may be provided free of charge to the resident and non-resident, such as certain counseling and employment session. Other interactive sessions, such as gaming sessions, may require the payment of a fee in order for the non-resident to participate. In such scenarios, payment may be made from a funding account maintained by the resident account system on behalf of the resident, or payment may be made by the non-resident on a one-time basis, or by contributions to the resident's funding account maintained by the resident account system.

At step 355, the visitation module of the resident device via which the message has been provided to the resident in order to determine whether to initiate a request for an interactive session with the non-resident. The visitation module may require positive confirmation from the resident before determining whether to pursue an immediate live interactive session with the non-resident. Certain communications services may be provided to residents based on payment of a fee for those services, such that a resident may desire to minimize unnecessary communications. Accordingly, the receipt of certain messages may obviate the need for any immediate communication between the resident and the non-resident, such that the resident may decline the option, at step 355, to initiate a request for a live interactive session with the non-resident.

If the resident has indicated a request for a live interactive session, at step 360, the available formats for an immediate live interactive session between the resident and non-resident are determined. As described, the resident may participate in interactive sessions using a variety of different resident devices. Accordingly, certain interactive formats may be unavailable based on the resident device from which the resident has accessed the message from the non-resident. For example, a wall-mounted resident terminal may not include video capabilities, or may not allow video based on a non-private installation location of the terminal. In certain embodiments, certain interactive formats may be unavailable due to the limited capacity of the monitoring system 160 to accommodate additional interactive sessions of a certain type. For instance, a video visitation session, requiring the greatest monitoring resources, may be unavailable at a certain time, whereas a voice visitation session, requiring fewer monitoring resources, may be accommodated using the available resources of the monitoring system. In certain embodiments, the live interactive session may be limited to strictly text communications that can be easily reviewed and approved for delivery with minimal burden on the monitoring system. As described, certain interactive formats may be limited to particular classifications of residents based on their privilege status. For instance, high-risk inmates may be limited to audio or text messaging-initiated interactive sessions, whereas a low-risk resident may be allowed video message-initiated interactive sessions.

At step 365, the availability of the resident for an immediate, or near immediate live interactive session is determined. As described, in certain embodiments, the resident communications system may interoperate with interactive software, such as a mobile app, installed on the personal communication device of the resident. In such embodiments, the live availability module 170 of the visitation system 145 may query the interactive software installed on the personal device of the non-resident in order to determine the immediate availability of non-resident. In certain embodiments, the interactive software installed on the personal device of the non-resident may respond to such a query by notifying the non-resident of the immediate availability of an approved interactive session with the resident. In certain embodiments, the notification may also allow the non-resident to select between the available interactive formats for an immediate live interactive session. In certain embodiments, such notification may be generated and delivered to the non-resident personal device as a push notification. In such embodiments, the non-resident may confirm their availability via response to the push notification. In certain embodiments, the interactive software installed on the personal device of the non-resident may be configured, with the consent of the non-resident, to presume availability of the non-resident as long as the interactive software can confirm the personal device of the non-resident is currently in use. In such a manner, the non-resident may improve the chances of establishing a live interactive session with a resident by pre-approving requests for live interactive requests from the resident. As described above, the non-resident may be provided the opportunity to designate such an availability at the time of recording the message for the resident. In certain embodiments, the availability of the non-resident may be determined based on a query to a third-party service provider presence status for the non-resident.

By notifying the non-resident of the approved availability of an immediate interactive session with the resident, the non-resident may be more inclined to accept the interactive session request, rather than wait for the next scheduled availability of the resident for visitation session. In addition, by pre-approving the interactive session, the non-resident may be spared from having to request and schedule a visitation session. In this manner, messaging-initiated interactive sessions may result in increased opportunities for interactive sessions. In addition, by initiating the live interactive session request after the resident has reviewed the message, the resident is provided with the opportunity to evaluate whether an immediate live interactive session with the non-resident is warranted.

If, at step 370, the resident indicates that an immediate live interactive session with the non-resident is desired, at step 375, a request for an immediate interactive session is issued to the non-resident. As described, the notification may indicate that the resident is available for an immediate interactive session and that the immediate interactive session has been approved. In certain embodiments, the request provided at step 375 may also indicate the duration of the resident's availability for an immediate interactive session. As described, in certain instances, a resident may be provided exclusive use of a resident communication device for a short duration and according to a strict visitation schedule. Also as described, a non-resident may be willing to accept an interactive session request from a resident, but may not be able to do so immediately. Accordingly, the interactive session request issued at step 375 indicating the duration may also allow the resident to accept the interactive session request, but may do so with a delay that may be accommodated by the duration of the resident's use of the resident communications device.

For instance, a message-initiated visitation interactive request may be issued from a resident that has one hour of remaining scheduled use of a resident device. In such scenarios, the interactive session request issued at step 375 may specify the request for the interactive session and the resident's availability for the next hour. Via the interactive session request notification, the non-resident may be provided with the option to immediately accept the interactive session request, decline the request, or accept the request with a delay that allows for an interactive session within the duration of the scheduled use of the mobile device for the resident.

For example, a push notification provided to a mobile device app installed on the personal device of the non-resident may indicate the request for an interactive session and the one hour of remaining scheduled availability by the resident. The mobile device app may allow the non-resident to immediately accept or to accept the request with a delay of five minutes to fifty-five minutes, thus providing for the live interactive session during the limited availability of the resident. If the non-resident has indicated a delayed acceptance, the resident is notified of the delay and the visitation system begins a timer counting down the delay specified by the non-resident. Upon expiration of the timer, the visitation system prompts the resident to re-try the message-initiated interactive session request.

In scenarios where the non-resident accepts the request for the live interactive session from a resident, certain embodiments may allow the non-resident to join the resident in an ongoing session. For instance, in scenarios where the resident is utilizing a resident device to participate in a gaming session at the time a non-resident accepts a request for a live interactive session, the non-resident may be provided with the option to join the resident in the ongoing gaming session. As described, in various embodiments, the non-resident may participate in interactive gaming sessions by joining a resident in game play, or by observing and interacting with a resident during game play. A non-resident may similarly join a resident in other types of ongoing sessions, such as education and counseling sessions. For instance, if a resident is utilizing the resident device to participate in a counseling session at the time the non-resident accepts a request for an interactive session, the non-resident may be notified of the resident's ongoing counseling session and may be provided with the option of joining the resident in the ongoing counseling session.

The foregoing has outlined rather broadly the features and technical advantages of the present invention in order that the detailed description of the invention that follows may be better understood. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A system for providing a resident of a controlled-environment facility with messaging-initiated interaction sessions, the system comprising:
 a messaging system configured to:

record a message for the resident, wherein the message is recorded by a non-resident;

a resident communications system configured to:
receive a request for use of a resident device by the resident;
authorize exclusive use of the resident device by the resident for a first time duration;
notify the resident of the message from the non-resident;
present the message to the resident via the resident device; and
determine an approval for an immediate interactive session between the resident and the non-resident; and
issue a request for the approved immediate interactive session to the non-resident indicating current availability of the resident for the interactive session until the expiration of the first time duration of the resident's authorized exclusive use of the resident device, wherein the request for the immediate interactive session comprises an option for the non-resident to delay accepting the request for the interactive session for an amount of time selected by the non-resident within a first delay interval and to retry the request when the selected amount of time elapses.

2. The system of claim 1, wherein an availability of the non-resident for the approved interactive session is determined by interfacing with a non-resident software application installed on a personal device of the non-resident, wherein the non-resident software application allows the non-resident to participate in interactive sessions hosted by the resident communications system.

3. The system of claim 2, wherein the non-resident software application is configured to detect whether the non-resident is currently using the personal device.

4. The system of claim 1, wherein the approval is determined based on whether the resident is allowed to participate in interactive sessions with the non-resident.

5. The system of claim 1, further comprising a monitoring system configured to monitor interactive sessions, wherein determining the availability of the non-resident for the interactive session comprises determining whether the monitoring system has capacity for monitoring the interactive session between the resident and the non-resident.

6. The system of claim 1, wherein the first delay interval is prior to the expiration of the first time duration of the resident's authorized exclusive use of the resident device.

7. A method for providing a resident of a controlled-environment facility with messaging-initiated interactive sessions, the method comprising:
creating a message for the resident, wherein the message is created by a non-resident for the resident;
receiving a request for use of a resident device by the resident;
authorizing exclusive use of the resident device by the resident;
notifying the resident of the message from the non-resident;
presenting the message to the resident via the resident device;
determining an approval for an immediate interactive session between the resident and the non-resident; and
issuing a request to the non-resident for the approved immediate interactive session indicating current availability of the resident for the interactive session until the expiration of the first time duration of the resident's authorized exclusive use of the resident device, wherein the request for the immediate interactive session comprises an option for the non-resident to delay accepting the request for the interactive session for an amount of time selected by the non-resident within a first delay interval and to retry the request when the selected amount of time elapses.

8. The method of claim 7, wherein an availability of the non-resident for the interactive session is determined by interfacing with a non-resident software application installed on a personal device of the non-resident, wherein the non-resident software application allows the non-resident to participate in interactive sessions hosted by the resident communications system.

9. The method of claim 8, wherein the non-resident software application is configured to detect whether the non-resident is currently using the personal device.

10. The method of claim 7, wherein the approval is determined based on whether the resident is allowed to participate in interactive sessions with the non-resident.

11. The method of claim 7, wherein determining the availability of the non-resident for the interactive session comprising determining whether a monitoring system has capacity for monitoring the interactive session between the resident and the non-resident.

12. The method of claim 7, wherein the first delay interval is prior to the expiration of the first time duration of the resident's authorized exclusive use of the resident device.

13. A computer-readable storage device having program instructions stored thereon for providing a resident of a controlled-environment facility with interactive services, upon execution by one or more processors, the program instructions cause the one or more processors to:
present a message for the resident, wherein the message is created by a non-resident for the resident;
receive a request for use of a resident device by the resident;
authorize exclusive use of the resident device by the resident;
notify the resident of the message from the non-resident;
present the message to the resident via the resident device;
determine an approval for an immediate interactive session between the resident and the non-resident; and
issue a request to the non-resident for the approved immediate interactive session with the resident, wherein the request indicates current availability of the resident for the interactive session until the expiration of the first time duration of the resident's authorized exclusive use of the resident device, wherein the request for the immediate interactive session comprises an option for the non-resident to delay accepting the request for the interactive session for an amount of time selected by the non-resident within a first delay interval and to retry the request when the selected amount of time elapses.

14. The computer-readable storage device of claim 13, wherein an availability of the non-resident for the interactive session is determined by interfacing with a non-resident software application installed on a personal device of the non-resident, wherein the non-resident software application allows the non-resident to participate in interactive sessions hosted by the resident communications system.

15. The computer-readable storage device of claim 14, wherein the non-resident software application is configured to detect whether the non-resident is currently using the personal device.

16. The computer-readable storage device of claim 13, wherein the approval is determined based on whether the resident is allowed to participate in visitation sessions with the non-resident.

17. The computer-readable storage device of claim 13, wherein determining the availability of the non-resident for the session comprising determining whether a monitoring system has capacity for monitoring the session between the resident and the non-resident.

18. The computer-readable storage device of claim 13, wherein the first delay interval is prior to the expiration of the first time duration of the resident's authorized exclusive use of the resident device.

\* \* \* \* \*